United States Patent [19]
Sekine et al.

[11] Patent Number: 6,022,126
[45] Date of Patent: Feb. 8, 2000

[54] LASER POINTER

[75] Inventors: Kumajiro Sekine; Takeshi Kobayashi, both of Sano, Japan

[73] Assignee: Sekinos Co., Ltd., Sano, Japan

[21] Appl. No.: 08/883,100

[22] Filed: Jun. 26, 1997

[30] Foreign Application Priority Data

Jul. 4, 1996  [JP]  Japan ................................. 8-192747

[51] Int. Cl.[7] ........................... F21L 15/02; F21V 5/02
[52] U.S. Cl. ........................ 362/259; 362/187; 362/282; 362/339; 359/15
[58] Field of Search ................................ 362/259, 268, 362/299–303, 282, 157, 186–188, 326, 339, 322; 33/241, DIG. 21; 359/1, 5, 15, 19

[56] References Cited

U.S. PATENT DOCUMENTS

| | | |
|---|---|---|
| 3,724,953 | 4/1973 | Johnston, Jr. ..................... 33/DIG. 21 |
| 5,024,494 | 6/1991 | Williams et al. ........................... 359/1 |
| 5,052,801 | 10/1991 | Downes, Jr. et al. ..................... 33/241 |
| 5,331,395 | 7/1994 | Piske et al. ........................ 33/DIG. 21 |
| 5,368,392 | 11/1994 | Hollander et al. ....................... 362/259 |
| 5,450,148 | 9/1995 | Shu et al. ................................ 362/259 |
| 5,483,362 | 1/1996 | Tai et al. ..................................... 359/1 |
| 5,566,459 | 10/1996 | Breda ................................. 33/DIG. 21 |

FOREIGN PATENT DOCUMENTS

| | | |
|---|---|---|
| 2-141721 | 5/1990 | Japan . |
| 2-280112 | 11/1990 | Japan . |
| 6-118342 | 4/1994 | Japan . |
| 6-175076 | 6/1994 | Japan . |
| 6-214192 | 8/1994 | Japan . |
| 7-134270 | 5/1995 | Japan . |

*Primary Examiner*—Alan Cariaso
*Attorney, Agent, or Firm*—Oliff & Berridge, PLC

[57] ABSTRACT

The laser pointer of this invention includes: a laser pointer main body for emitting a visible laser beam; and a deflection optical element disposed on the central axis of the laser beam and adapted to deflect the direction along which the emitted laser beam passes.

11 Claims, 9 Drawing Sheets

CENTRAL AXIS OF LASER BEAM
(OPTICAL AXIS)

CENTRAL AXIS OF LASER BEAM
(OPTICAL AXIS)

CENTRAL AXIS OF LASER BEAM

CENTRAL AXIS OF LASER BEAM

LASER POINTER

BACKGROUND OF THE INVENTION

1. Field of the Invention

The present invention relates to a laser pointer. More specifically, the present invention relates to an improved laser pointer with which the presenter can indicate an intended portion by a projected spot formed by projecting a laser beam at, for example, conferences or the like.

2. Description of the Related Art

In recent years, at conferences or the like, presenters often use laser pointers to indicate an intended portion remote from the presenter accurately or to indicate an intended portion explicitly in a dark environment.

A conventional laser pointer (not shown) includes, in general, a cylindrical laser pointer main body as large as, for example, a fountain pen; a driving circuit which is provided in the laser pointer main body and activated by a battery; and a light emission element which is provided near the fore end of the laser pointer main body and serves to emit a red laser beam by the action of the driving circuit, wherein a laser beam is emitted from the fore end of the laser pointer main body by switching on the switch provided at the laser pointer main body. When the laser pointer is used, the fore end of the laser pointer main body is directed to the portion where the presenter intends to indicate.

However, in the conventional laser pointer, since the laser beam is emitted along the axis of the laser pointer, as shown in FIG. 16, the laser beam cannot be projected accurately to the intended portion if the presenter does not align the axis of the laser pointer with the axis of the his arm by bending his wrist.

Consequently, the laser pointer is liable to be held in an unnatural posture, and accordingly the laser beam is liable to become unsteady, so that the projected spot is liable to become unstable, i.e., the projected spot is liable to move. Consequently, the viewer's attention is unfavorably drawn to the moving projected spot.

Further, according to the conventional laser pointer, an intended portion is indicated only by a projected spot formed by projecting a laser beam from a remote place. However, in some cases, the presenter wants to indicate the intended portion directly by the laser pointer itself. Therefore, the laser pointer will be convenient if the laser pointer have a function of enabling the presenter to indicate the intended portion directly by the laser pointer itself.

SUMMARY OF THE INVENTION

The present invention is accomplished in view of the above circumstances. It is an object of the present invention to provide a laser pointer with which the presenter can easily project a laser beam to an intended portion in a stable manner.

It is another object of the present invention to provide a laser pointer having a function of enabling the presenter to indicate the intended portion directly by the laser pointer itself.

To achieve the above objects, a first aspect of the present invention provides a laser pointer including: a laser pointer main body for emitting a visible laser beam; and a deflection optical element disposed on the central axis of the laser beam and adapted to deflect the direction along which the emitted laser beam passes.

Also, a second aspect of the present invention provides a laser pointer including: a laser pointer main body for emitting a visible laser beam; an extensible cylinder which is secured to the laser pointer main body in such a manner that one end of the extensible cylinder is joined to the fore end of the laser pointer main body and which has a hollow portion provided in such manner as to be aligned with the central axis of the laser beam; and a light diffusion guidance member for emitting light by diffusing the laser beam having passed through the hollow portion, the light diffusion guidance member being secured to the other end of the extensible cylinder.

In the second aspect of the present invention, the light diffusion guidance member may have a penetration hole which is aligned with the hollow portion of the extensible cylinder and adapted to diffuse the laser beam.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which.

DETAILED DESCRIPTION OF THE INVENTION

Figure 1:
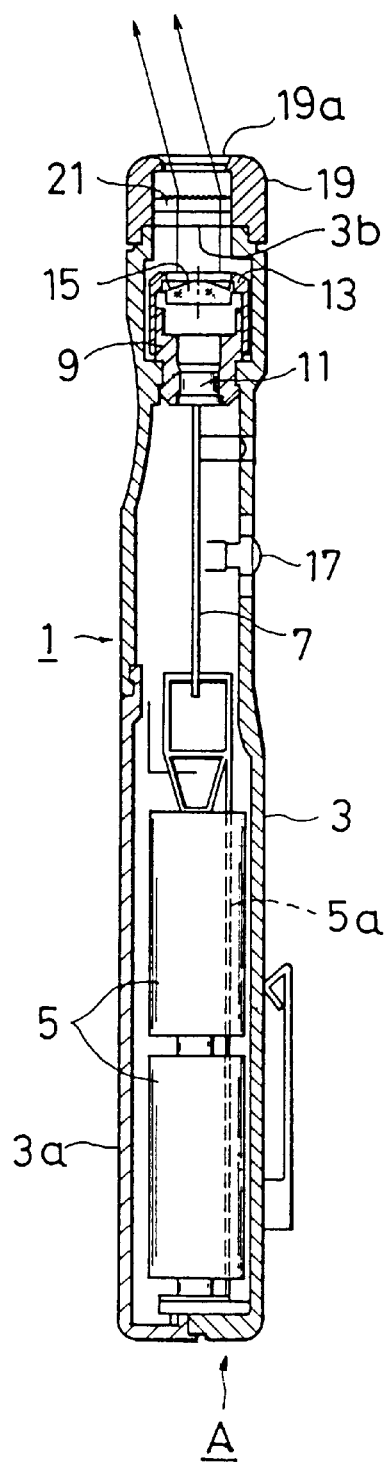
FIG. 1 is a sectional view showing the entire constitution of a laser pointer according to a first embodiment in a first aspect of the present invention, in which a supporting cap accommodating a micro prism array serving as a deflection optical element is attached to the laser pointer main body.

Hereinafter, referring to the drawings, preferred embodiments of the present invention will be described.

(A) First Aspect of the Invention

Firstly, preferred embodiments of a laser pointer according to a first aspect of the present invention will be described with reference to FIGS. 1 to 10.

(A-1) First Embodiment in First Aspect

As shown in FIG. 1, the laser pointer according to the first aspect of the present invention includes a laser pointer main body 1 and a supporting cap 19.

The laser pointer main body 1 includes a casing 3, a battery 5 accommodated in the casing 3, a driving circuit 7 accommodated in the casing 3, a holding cylinder 9 provided in the casing 3, a supporting cylinder 13 provided at the exterior of the holding cylinder 9, a light emission element 11 held in the holding cylinder 9, and a collimator lens 15 supported by the supporting cylinder 13.

The casing 3 is made of a synthetic resin or metallic material, and molded in the form of a long-and-narrow and slightly flat cylinder for facilitating easy grasping. The casing 3 has an opening 3b formed at the fore end thereof, i.e., at the end opposite to the end where the battery 5 as later described is accommodated. Also, the casing 3 has at a portion thereof an openable lid 3a for facilitating the mounting and dismounting of the battery 5.

As the battery 5, a dry element battery of type 3 or type 4 is employed. The battery 5 is accommodated at the tail end portion of the casing 3 (i.e., at the portion shown at the lower part of FIG. 1). The battery 5 is connected through contact electrodes via a lead wire 5a to the driving circuit 7, while detailed explanation thereof is omitted. As the battery 5, other than the dry element battery, a button-shaped battery, and other known batteries can be used.

The driving circuit 7 is a known electronic circuit which causes the light emission element 11 to emit light when current is supplied from the battery 5 by switching on a switch 17. The switch 17 is provided on the casing 3 in such a manner as to protrude from the casing 3. It should be noted that the driving circuit 7 is schematically drawn and detailed structure of thereof is not illustrated in FIG. 1.

Figure 2:
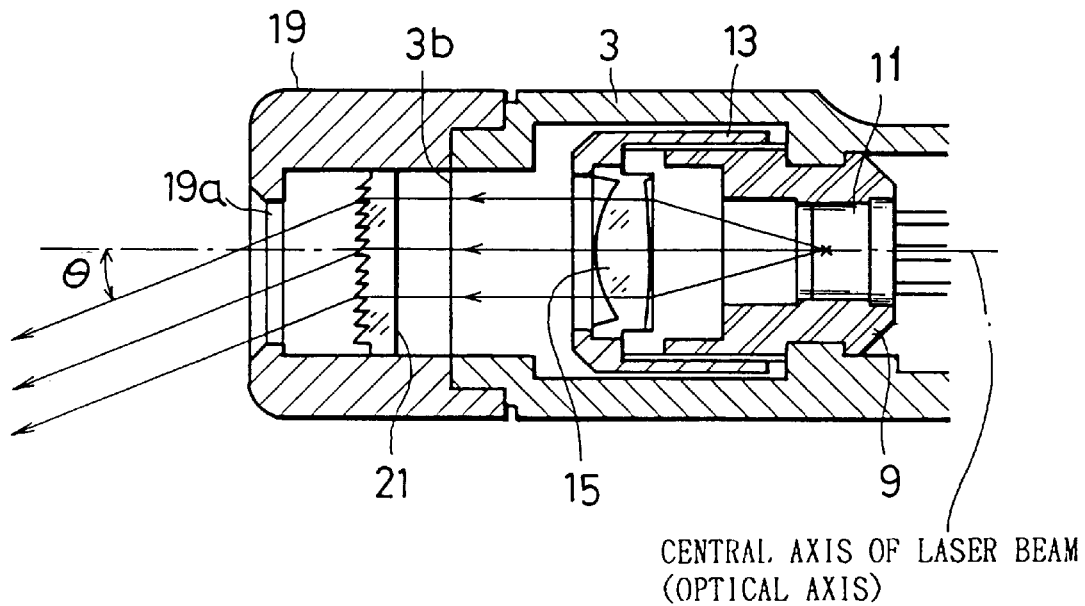
FIG. 2 is a longitudinal sectional view showing the main portion of the laser pointer according to the first embodiment in the first aspect of the present invention.

As shown in FIG. 2, the holding cylinder 9 is inserted into the casing 3 and secured at a position slightly inwardly of the fore end of the casing 3.

The light emission element 11 is secured in the holding cylinder 9. The light emission element 11 is disposed in such a manner that the element 11 faces the opening 3b formed at the fore end of the casing 3 and that the optical axis of the light emission element 11 is aligned with the optical axes of the other optical elements. The light emission element 11 is constituted by a known semiconductor light emission element which emits, for example, a red laser beam.

As the light emission element 11, an element which generates a green laser beam, a blue laser beam, or the like of second higher harmonics may be employed other than the element which generates a red laser beam. However, the element which generates a red laser beam is preferred from the viewpoint of performance of drawing the attention of the viewer, easiness in manufacturing, and manufacturing cost.

The supporting cylinder 13 is secured to the exterior of the holding cylinder 9 in the casing 3 at the fore end side of light emission element 11.

The collimator lens 15 is secured in the supporting cylinder 13 in such a manner that the optical axis of the collimator lens 15 is aligned with the optical axis of the light emission element 11. The collimator lens 15 is constituted by a known lens which serves to convert the laser beams emitted from the light emission element 11 into collimated laser beams. As the collimator lens 15, an aspherical single lens made of glass or plastics is suitably used.

The supporting cap 19 is disposed at the fore end of the casing 3, i.e., at the opening 3b side of the casing 3. The cap 19 is made of a synthetic resin or metallic material and molded in the form of a cap. At the fore end of the cap 19, an emission aperture 19a for allowing the laser beam to pass is formed. It should be noted that throughout of the specification the term "aperture" refers to an optical aperture.

Figure 3:
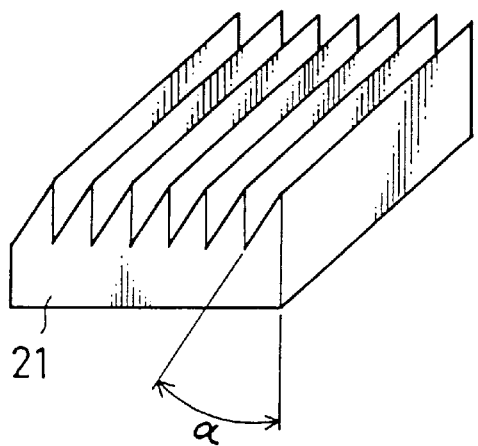
FIG. 3 is an enlarged perspective view showing the main portion of the micro prism array shown in FIG. 2.

In the supporting cap 19, a micro prism array 21 serving as a deflection optical member is provided. The micro prism array 21 is secured in such a manner that the optical axis of the micro prism array 21 is aligned with the optical axes of the light emission element 11 and the other optical elements. The array 21 of the first embodiment has a beam deflection angle θ of about 26°, and serves to deflect the laser beam received from the collimator lens 15 by about 26°, to thereby emit the beam through the emission aperture 19a of the supporting cap 19 to the outside, as shown FIG. 2. The micro prism array 21 is molded from an optical material having a refractive index n falling within a range of 1.45 to 1.9 by a known method. The micro prism array 21 has an apex angle of a as shown in FIG. 3. The apex angle a is 45° in this embodiment, but the angle α is not limited thereto so long as the desired beam deflection angle can be obtained. Thus, the emission aperture 19a of the supporting cap 19 is formed at a position lying on the direction deflected by about 26° from the optical axis of the collimator lens 15.

In the laser pointer according to the first embodiment in the first aspect of the present invention having the above-mentioned constitution, when the presenter grasps the laser pointer A with his hand and switches on the switch 17, the laser beams are emitted from the light emission element 11, converted into collimated beams at the collimator lens 15, deflected by the beam deflection angle θ of about 26° at the micro prism array 21, and emitted from the emission aperture 19a formed at the fore end of the supporting cap 19 to the outside.

It should be noted that the beam deflection angle of the micro prism array 21 is not limited thereto and can have other values so long as the beam-proceeding direction of the emitted laser beam can be deflected to a favorable direction.

Figure 16:
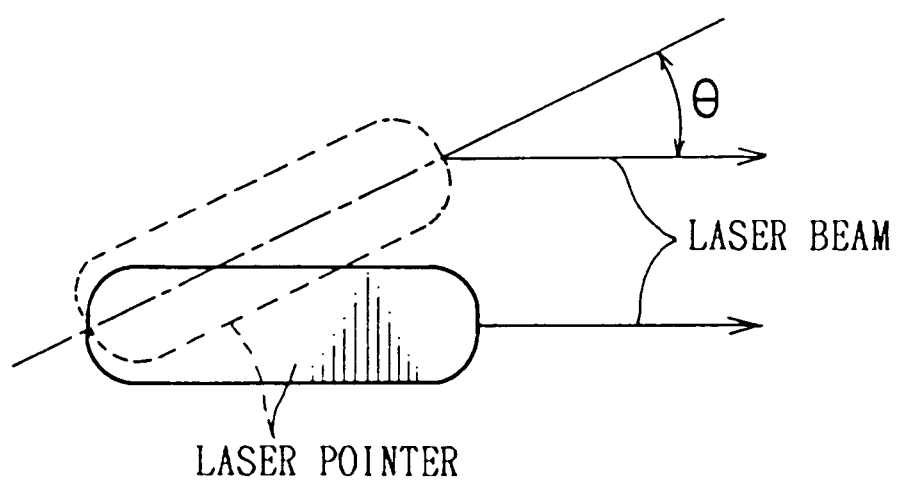
FIG. 16 is a view illustrating the state in which the laser beam is emitted from the laser pointer.

Consequently, the laser beam emitted to the outside is deflected by about 26° with respect to the longitudinal axis of the laser pointer A, as denoted by the dashed line in FIG. 16.

According to the laser pointer according to the first embodiment in the first aspect of the present invention, the presenter can align the axis of the laser pointer A with the axis of his arm without unnaturally bending his wrist. That is, the presenter can emit the laser beam along the intended direction simply by naturally grasping the laser pointer A. Consequently, the laser pointer A can be held in a stable posture, so that the projected spot of the laser beam becomes stable. Therefore, the presenter and the viewer can have a sense of stability, and also easiness in handling the laser pointer is enhanced.

Also, since the micro prism array 21 serving as the deflection optical element is a flat-plate-shaped element, spaces can be saved and the array can be mass-produced inexpensively by an injection molding method or the like.

(A-2) Second Embodiment in First Aspect

In the first embodiment in the first aspect of the present invention, the micro prism array 21 is employed as the deflection optical element. However, the deflection optical element is not limited thereto so long as the deflection optical element can deflect the laser beam emitted from the light emission element 11 by a preferable beam deflection angle with respect to the optical axis thereof. Incidentally, according to the inventor's study, the allowable range of the beam deflection angle is between about 10° and about 80°, and the preferable range of the beam deflection angle is around 30°.

Figure 4:
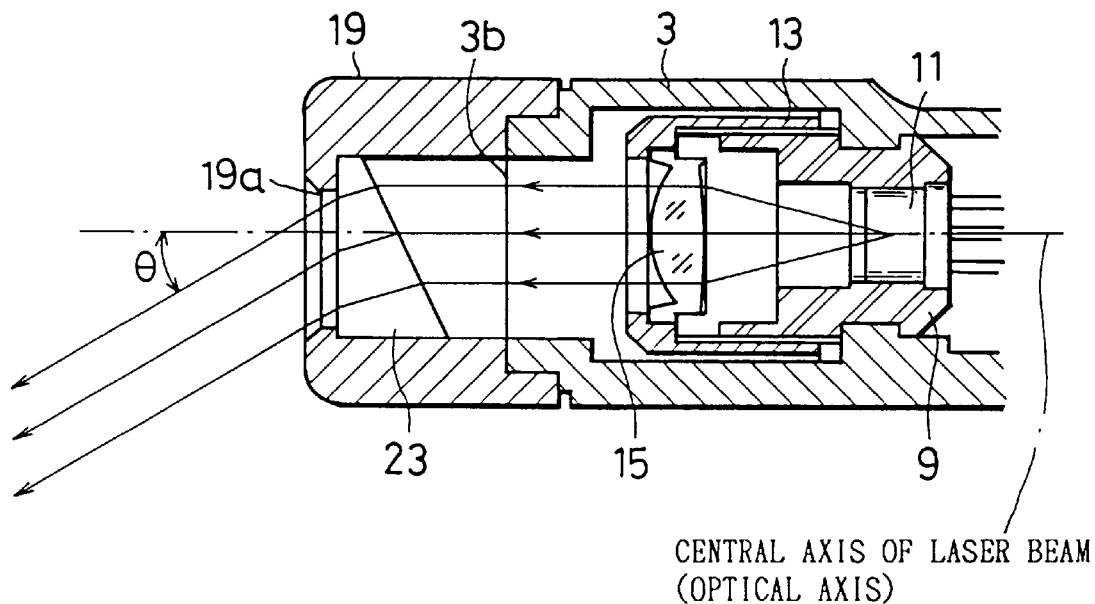
FIG. 4 is a longitudinal sectional view showing the main portion of the laser pointer according to a second embodiment in the first aspect of the present invention, in which a prism is employed as the deflection optical element.
Figure 5:
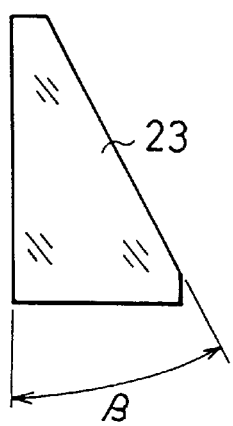
FIG. 5 is a enlarged view showing the prism shown in FIG. 4.

Referring to FIG. 4, a second embodiment of the laser pointer according to the first aspect of the present invention will be described.

In the second embodiment, a prism 23 made of optical glass is employed as the deflection optical element. Incidentally, in the description of second and subsequent embodiments, the constitution of the laser pointer is the same as in the first embodiment except for the deflection optical element. Therefore, descriptions of the same features as in the first embodiment are omitted.

As the prism 23, SF 11 having a refractive index $\underline{n}$ of 1.778 at the wavelength $\lambda_0$ of 635 nm and a prism apex angle $\beta$ of 29° (and the laser beam deflection angle $\theta$ of about 30°) is preferably employed. This is because the SF is more compact compared with the other prisms, such as BK7, which has refractive index $\underline{n}$ of 1.515 at the wavelength $\lambda_0$ of 635 nm. Further, from the viewpoint of compactness, it is preferred that the prism 23 has a refractive index of 1.7 or more.

In the second embodiment, since the transmittance of the prism can be enhanced to about 99% by forming a single-layer antireflection coating made of $MgF_2$ on the surface thereof. Accordingly, an advantageous effect that the utilization efficiency of the laser beam becomes high can be obtained.

Incidentally, in the second embodiment, owing to the posture of the prism, the irradiation width of the laser beam measured after the laser beam passed through the prism 23 is substantially the same as the irradiation width of the laser beam measured before the laser beam passes through the prism 23 (Note that the term "irradiation width" as used herein refers to the distance between the uppermost and lowermost arrow lines in the drawing, both denoting the laser beams.). As shown in FIG. 4, the irradiation width after the prism 23 is the same as the irradiation width before the prism 23.

Figure 6:
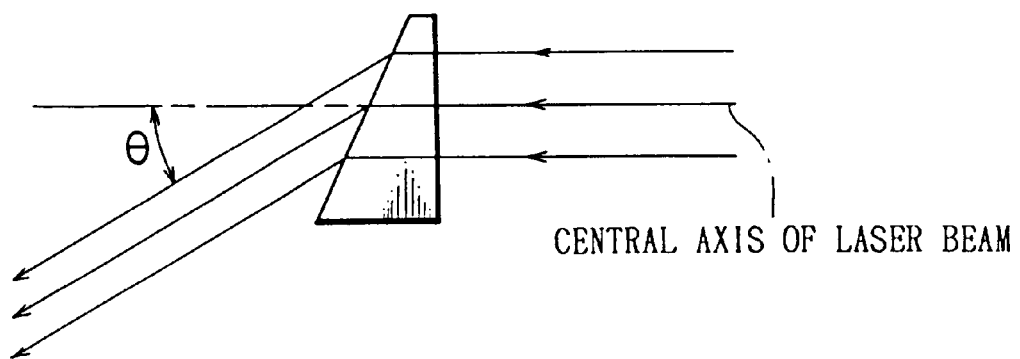
FIG. 6 is a schematic sectional view showing the prism according to a modification of the second embodiment in the first aspect of the present invention.

The second embodiment can be modified as shown in FIG. 6. As is known from FIG. 6, in this modification, the same prism 23 as used in the second embodiment is employed, but the prism 23 is reversed in the left-and-right direction thereof in FIG. 6, i.e., the prism 23 is disposed in such a manner that the planes for receiving and emitting the laser beam are replaced with each other, compared with the above-mentioned second embodiment. Owing to this constitution, while keeping the beam deflection angle $\theta$ the same as in the second embodiment, the irradiation width after the prism 23 is made narrower than the irradiation width before the prism 23.

Figure 7:
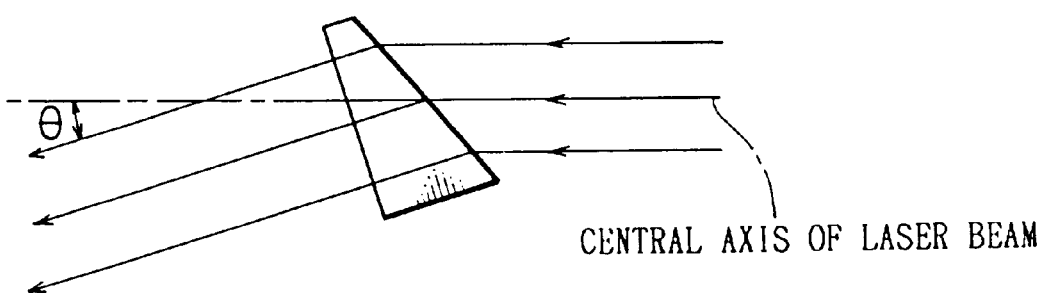
FIG. 7 is a schematic sectional view showing the prism according to another modification of the second embodiment-in the first aspect of the present invention.

FIG. 7 shows another modification of the second embodiment. As known from FIG. 7, in this modification, the same prism 23 as used in the second embodiment is employed and the posture of the prism 23 is slightly oblique with respect to the optical axes of the optical elements, compared with the second embodiment. Owing to this constitution, while keeping the beam deflection angle $\theta$ the same as in the second embodiment, the irradiation width after the prism 23 is made wider than the irradiation width before the prism 23.

In the second embodiment and its modifications, the same prism 23 is used. However, it should be noted that the shapes of the prism are not limited thereto so long as the embodiment and modification can produce the respective irradiation widths.

(A-3) Third Embodiment in First Aspect

Figure 8:
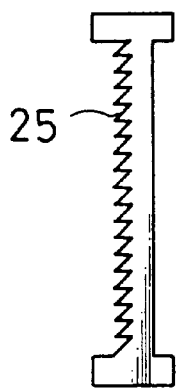
FIG. 8 is a sectional view showing a hologram element serving as the deflection optical element of the first aspect of the present invention.

Referring to FIG. 8, a third embodiment of the laser pointer in the first aspect of the present invention will be described.

In the third embodiment, a hologram element 25 having such a constitution as shown in FIG. 8 is employed as the deflection optical element.

When the hologram element 25 is employed as the deflection optical element, the constitution of the laser pointer becomes similar to that in which the micro prism array 21 is provided, as shown in FIG. 2.

The third embodiment in the first aspect produces an advantageous effect that the hologram element can not only deflect the laser beam but also diffuse and collect the laser beam.

(A-4) Fourth Embodiment in First Aspect

Figure 9:
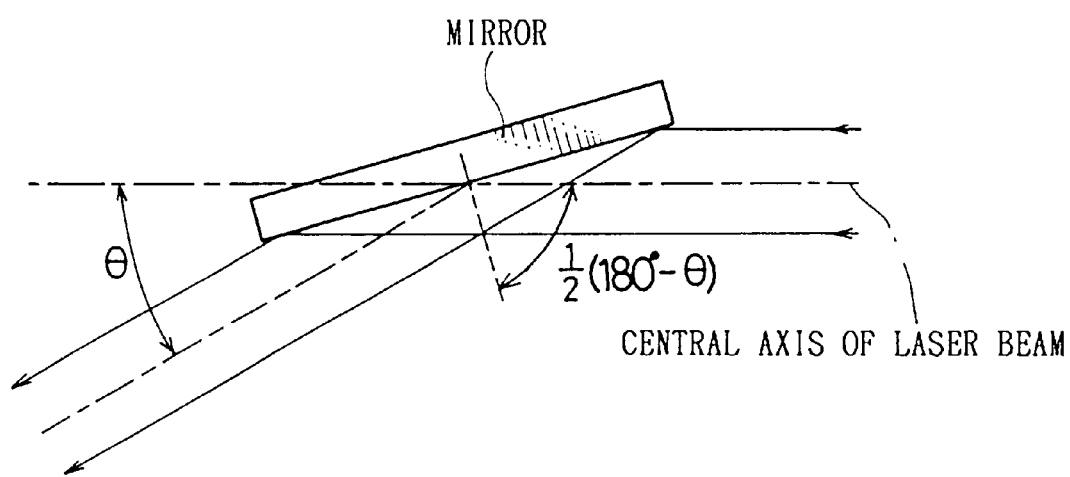
FIG. 9 is a schematic sectional view showing a mirror serving as the deflection optical element of the first aspect of the present invention.

Referring to FIG. 9, a fourth embodiment of the laser pointer of the first aspect of the present invention will be described.

In the fourth embodiment, as shown in FIG. 9, a mirror can be employed as the deflection optical element. The mirror can be obtained by forming a reflection film on the front or rear surface of a glass plate (hereinafter, referred to as "glass mirror"). Alternatively, a transmission member obtained by mirror-finishing crystalline material, such as calcite ($CaCO_3$) and lithium niobate ($LiNbO_3$) may be employed as the mirror.

An advantage of employing such a mirror as the deflection optical element is that the materials are very inexpensive, so that the production cost can be greatly reduced. For example, as the material of the glass mirror, known inexpensive glasses can be employed.

Another advantage of employing such a mirror as the deflection optical element is that the mirror can be formed as a part of the supporting cap 19 so as to reduce the number of constituting components of the laser pointer. Incidentally, forming such a mirror as a part of the supporting cap can be performed by forming an inner surface of the supporting cap 19 as an oblique surface and providing a flat reflection film made of glass or transmission member on the oblique inner surface. Thus, an oblique mirror formed as a part of the supporting cap 19 can be obtained.

(A-5) Fifth Embodiment in First Aspect

However, the fourth embodiment in which a single mirror is employed as the deflection optical element also has a disadvantage that the incidence angle of the laser beam must be adjusted to $\frac{1}{2} \cdot (180° - \theta)$ to obtain the beam deflection angle of $\theta$. Specifically, when the desired beam deflection angle $\theta$ is 30°, the incidence angle $\frac{1}{2} \cdot (180° - \theta)$ becomes 75°. Therefore, the length of the supporting cap 19 along the beam-proceeding direction of the laser beam becomes excessively long, which is disadvantageous in providing a laser pointer having a good outer appearance.

Figure 10:
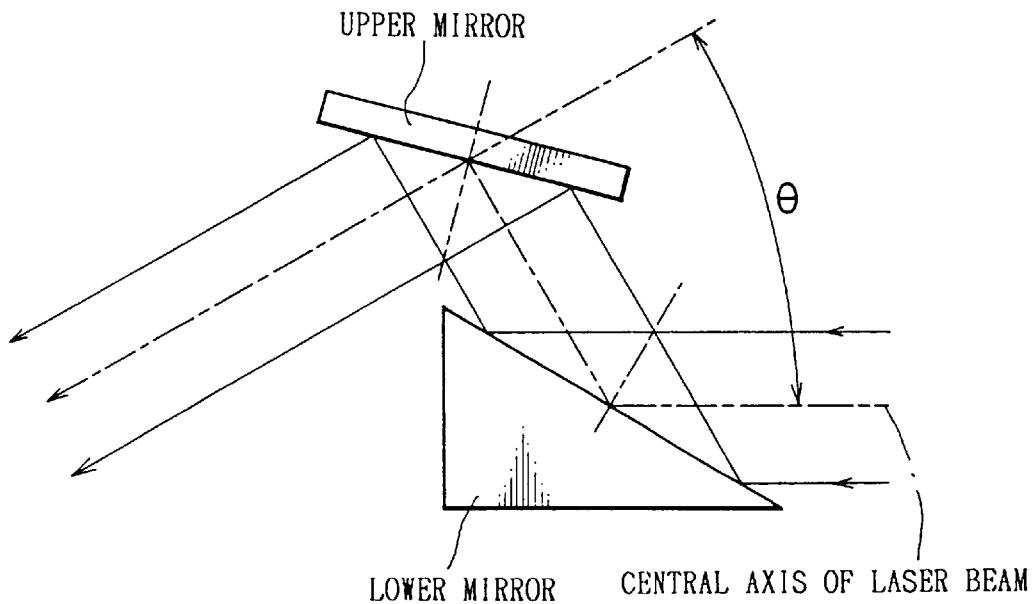
FIG. 10 is a schematic sectional view showing the constitution in which two mirrors are employed as the deflection optical element of the first aspect of the present invention.

To solve the above-mentioned problem, a fifth embodiment in which the deflection optical element includes two mirrors is proposed, as shown in FIG. 10. In the fifth embodiment, the deflection optical element includes a lower mirror having a prism shape and an upper mirror having a flat-plate shape.

In this embodiment, the laser beam is firstly reflected at the lower mirror and then at the upper mirror, to thereby be emitted to the outside.

According to the fifth embodiment, the desired deflection angle θ can be achieved while keeping the length of the supporting cap 19 in the beam-proceeding direction small. Accordingly, the size of the laser pointer, particularly the supporting cap, can be reduced.

In the fifth embodiment, it should be noted that the shapes of the mirrors and the number of mirrors are not limited thereto so long as the above-described advantageous effect can be obtained.

(A-6) Sixth Embodiment in First Aspect

Figure 11:
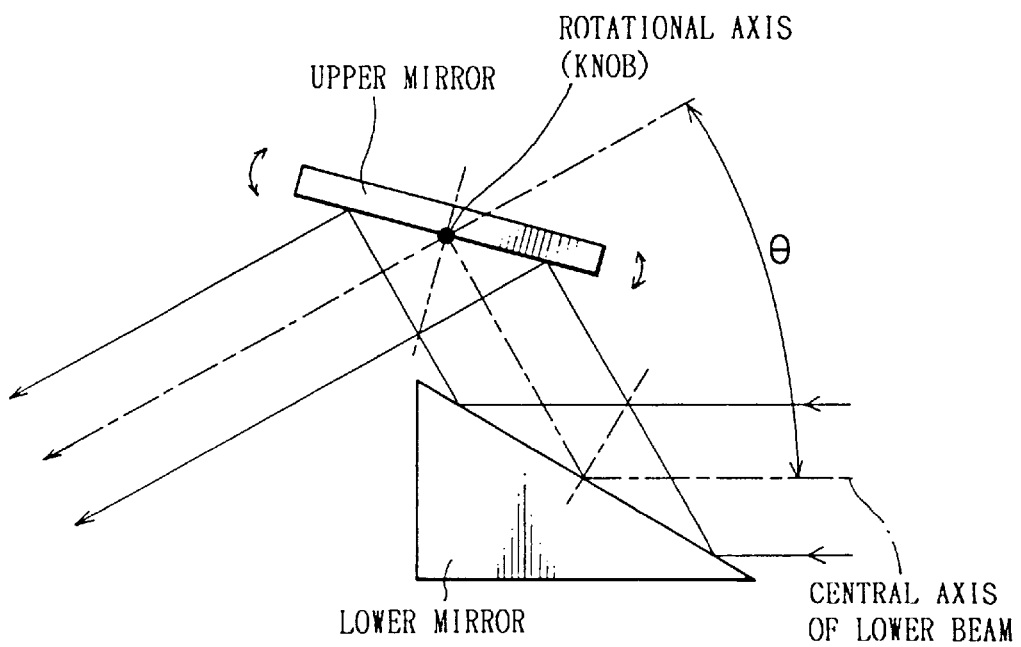
FIG. 11 is a schematic sectional view showing how the beam-proceeding direction changing means employed in the deflection optical element of the first aspect of the present invention works.

A sixth embodiment in the first aspect of the present invention will be described referring to FIG. 11. As shown in FIG. 11, in the sixth embodiment, deflection optical element includes beam-proceeding direction changing means. The beam-proceeding changing means includes a first mirror fixedly provided and a second mirror rotatable around a rotational axis of the second mirror. As shown in FIG. 11, the lower mirror (i.e., fixedly provided prism-shaped mirror) serves as the first mirror, and the upper mirror (i.e., flat-plate-shaped mirror) serves as the second mirror. Also, the upper mirror has a rotational axis and is rotatable around the axis. Further, a knob is provided at the rotational axis of the upper mirror, and the upper mirror can be rotated arbitrarily by turning the knob.

In the sixth embodiment, as shown in FIG. 11, the laser beam which firstly reflected at the lower mirror is then reflected at the upper mirror, to thereby be emitted to the outside, as in the fifth embodiment. Therefore, the beam-proceeding direction of the laser beam can be changed arbitrarily by turning the knob provided at the axis of the upper mirror, so that the deflection angle can be changed arbitrarily.

Thus, the sixth embodiment can produce an advantageous effect of reducing the size of the laser pointer, particularly the supporting cap, in the beam-proceeding direction. Also, this embodiment produce an advantageous effect that the deflection angle can be arbitrarily changed through an easy operation.

It should be noted that the constitution of the beam-proceeding direction changing means is not limited as described above so long as the deflection angle of the laser beam can be changed arbitrarily.

(A-7) Another Embodiment in First Aspect

In the above-mentioned embodiments of the first aspect of the present invention, the supporting cap 19 is not rotatable. However, the cap 19 may be constituted as to be rotatable with respect to the casing 3. When this constitution is employed, the laser beam can be emitted in various directions.

(B) Second Aspect of the Invention

Next, a laser pointer according to a second aspect of the present invention will be described with reference to FIGS. 12 to 15. In the following description of the second aspect, members or elements identical to those of the first aspect are denoted by identical reference numerals or symbols.

(B-1) First Embodiment in Second Aspect

Firstly, a laser pointer according to a first embodiment in the second aspect of the present invention will be described.

Figure 12:
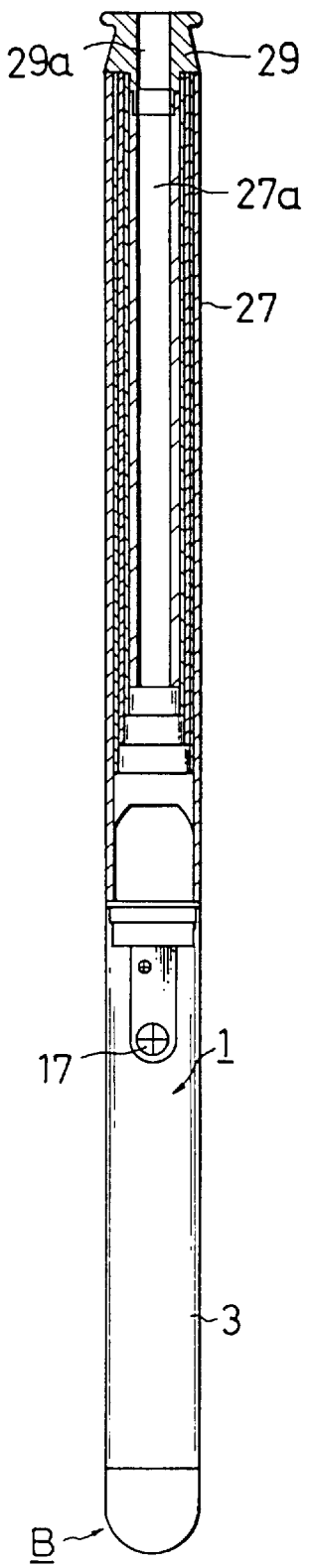
FIG. 12 is a sectional view showing the entire constitution of a laser pointer according to a second aspect of the present invention, in which an extensible cylinder attached with a light diffusion guidance member is attached to the laser pointer main body.
Figure 13:
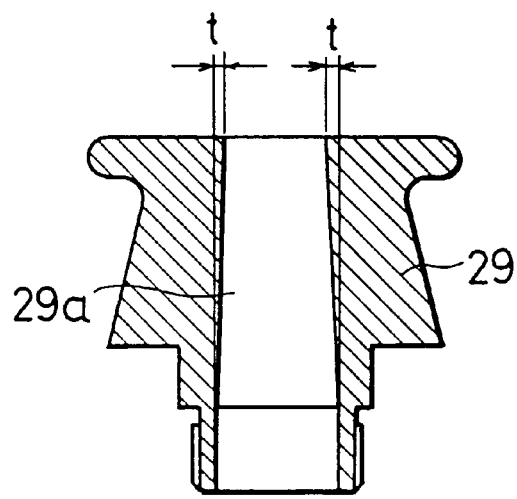
FIG. 13 is a longitudinal sectional view showing a first embodiment of the light diffusion guidance member according to the second aspect of the present invention.

As shown in FIG. 12, the laser pointer of the first embodiment in the second aspect has an extensible cylinder 27 and a light diffusion guidance member 29 in place of the supporting cap 19 of the first aspect. That is, the laser pointer according to the first embodiment in the second aspect includes a laser pointer main body 1, and extensible cylinder 27 secured to the main body 1 and having a hollow portion 27a, and a light diffusion guidance member 29 secured to the extensible cylinder 27. Incidentally, the term "hollow" means optical hollow throughout this specification.

More specifically, the extensible cylinder 27 having the hollow portion 27a is secured to the laser pointer main body 1 in such a manner that one end of the extensible cylinder 27 is joined to the fore end of the laser pointer main body 1.

The joining of the extensible cylinder 27 to the laser pointer main body 1 is conducted, for example, simply by joining the tail portion of the extensible cylinder 27 to the outer peripheral of the laser pointer main body 1. Alternatively, the joining may be conducted by forming a screw groove in the interior of the tail portion of the extensible cylinder 27 and a screw groove on the outer peripheral of the fore end of the laser pointer main body 1 and engaging the screw grooves with each other.

The extensible cylinder 27 is constituted by, for example, an extensible-rod-like member of a rod antenna type in which a plurality of unit cylindrical members are so connected as not to slip out and to form a plurality of stages. It should be noted that the extensible member 27 is not limited thereto as long as the cylinder has a hollow portion 27a.

The hollow portion 27a of the extensible cylinder 27 is formed in such manner as to be aligned with the central axis of the laser beam, that is, the axes of the light emission element 11 and the collimator lens 15 provided in the laser pointer main body 1.

The light diffusion guidance member 29 is secured to the extensible cylinder 27 in such a manner that the tail end of the member 29 is joined to the fore end of the extensible cylinder 27. The member 29 is made of a light guidance material, such as a material obtained by kneading acrylic resin material and a pigment having a high refractive index such as $TiO_2$.

The member 29 has a penetration hole 29a so tapered as to be narrowed by $t$ in the direction toward the open fore end thereof (i.e., the diameter of the open fore end of the penetration hole 29a is smaller by $2t$ than that of the open tail end thereof). The hole 29a has a inner surface processed as a rough surface.

Incidentally, the constitution of the interior of the laser pointer main body 1 is the same as in the first aspect of the present invention, that is, as shown in FIG. 1. Therefore, the detailed description and illustration in FIG. 11 of the interior of the laser pointer main body are omitted.

In the laser pointer B of the first embodiment in the second aspect having the above constitution, a laser beam passes through the opening 3b of the laser pointer main body 1, the hollow portion 27a of the extensible cylinder 27, and the penetration hole 29a of the light diffusion guidance member 29, and then is emitted to the outside. Concurrently, a part of the laser beam is diffused at the penetration hole 29a, which has a tapering-off shape and a rough inner surface, so that the member 29 itself is illuminated. Accordingly, the fore end of the laser pointer B can be easily found even in a dark environment.

Further, since the extensible cylinder 27 can be contracted and expanded easily, the laser pointer B can be used in long and short states.

Consequently, according to the laser pointer of the second aspect of the present invention, since the light diffusion guidance member 29 provided at the fore end of the laser pointer B is illuminated and the extensible cylinder 27 can be contracted and expanded, the intended portion can be indicated directly by the laser pointer B itself in an explicit manner. Further, since the laser beam is emitted from the penetration hole 29, the laser beam can be projected from a remote place.

(B-2) Other Embodiments in Second Aspect

In the above-mentioned embodiment in the second aspect of the present invention, as a constitution in which the light diffusion guidance member 29 is illuminated, the inner surface 29a of the penetration hole 29 is constituted as a rough surface. However, the second aspect of the present invention is not limited thereto so long as the light diffusion guidance member is illuminated.

Figure 14:
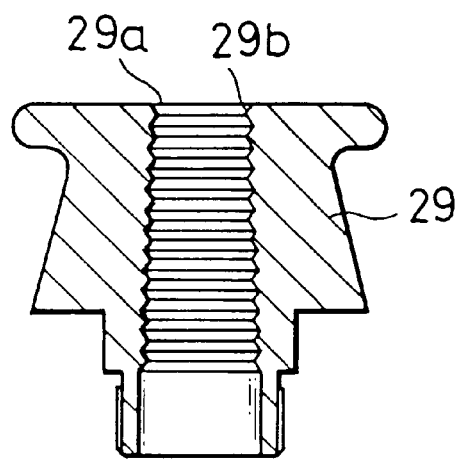
FIG. 14 is a longitudinal sectional view showing a second embodiment of the light diffusion guidance member according to the second aspect of the present invention.

For example, the inner surface 29a of the penetration hole 29 may be so constituted as to have a screw groove 29b, as shown in FIG. 14. According to this embodiment, the light is diffused at the screw groove 29b so that the light diffusion guidance member 29 is illuminated.

Further, from the viewpoint of obtaining a constitution in which the light diffusion guidance member 29 itself is illuminated, the light diffusion guidance member 29 does not need to have the penetration hole 29a.

Figure 15:
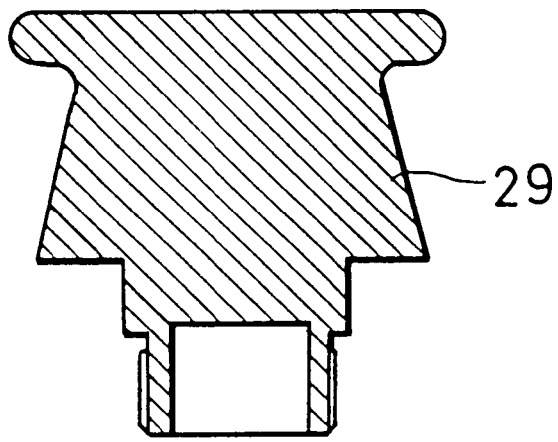
FIG. 15 is a longitudinal sectional view showing a third embodiment of the light diffusion guidance member according to the second aspect of the present invention.

For example, the light diffusion guidance member 29 may be so constituted that the member 29 does not have the penetration hole 29a, as shown in FIG. 15, and the member 29 itself is illuminated. Alternatively, the light diffusion guidance member 29 may be so constituted that the member 29 have a dead-end hole which is opened at the side facing the laser pointer 1 and unopened at the side facing the outside and the member 29 itself is illuminated, while the illustration of the light diffusion guidance member 29 of this constitution is omitted in the drawings.

(C) Advantageous Effects of the Invention

As described above, according to the laser pointer the first aspect of the present invention, since the laser beam emitted from the light emission element is deflected at the deflection optical element, the presenter can easily project a laser beam to an intended portion in a stable manner.

Further, according to the laser pointer of the second aspect of the present invention, since the laser beam emitted from the light emission element is diffused at the light diffusion guidance member, the intended portion can be indicated directly by the laser pointer itself. Further, in the second aspect of the present invention if the light diffusion guidance member has a penetration hole, the laser beam can be projected to the intended portion from a remote place in addition to the above-mentioned advantageous effect of the second aspect of the present invention.

Although the preferred embodiments of the present invention have been described above, it should be understood that the present invention is not limited thereto and that other modifications will be apparent to those skilled in the art without departing form the spirit of the invention.

The scope of the present invention, therefore, is to be determined solely by the appended claims.

What is claimed is:

1. A hand-held pointer that can project a beam without bending a wrist of a user in an unnatural posture, comprising:

a laser pointer main body that emits a visible laser beam, the main body having a longitudinal axis and being configured for hand-held use by a user; and a deflection optical element disposed on a central axis of the laser beam and adapted to deflect an optical axis of the visible laser beam so that there is a predetermined angle between the optical axis of the visible laser beam emitted from the laser pointer main body and the longitudinal axis of the laser pointer main body.

2. A laser pointer according to claim 1, wherein said deflection optical element includes a micro prism array.

3. A laser pointer according to claim 1, wherein said deflection optical element includes a prism.

4. A laser pointer according to claim 1 wherein said deflection optical element includes a hologram element.

5. A laser pointer according to claim 1, wherein said deflection optical element includes a mirror.

6. A laser pointer according to claim 1, wherein said deflection optical element includes a crystalline material whose surface for receiving the laser beam is subjected to mirror finish.

7. A laser pointer according to claim 1, wherein said deflection optical element includes a plurality of mirrors.

8. A laser pointer according to claim 1, wherein said deflection optical element comprises beam-proceeding direction changing means for changing the direction along which the emitted laser beam passes.

9. A laser pointer according to claim 8, wherein said beam-proceeding direction changing means comprises a first mirror fixedly provided and a second mirror rotatable around an rotational axis thereof.

10. A laser pointer according to claim 1, wherein said deflection optical element deflects the optical axis of the emitted laser beam by an angle of between 25° and 35° from the central axis, which corresponds to the longitudinal axis of the laser pointer main body.

11. A laser pointer comprising:

a laser pointer main body for emitting a visible laser beam; and a deflection optical element disposed on a central axis of the laser beam and adapted to deflect a direction along which the emitted laser beam passes by an angle of between 25° and 35° from the central axis.

\* \* \* \* \*

UNITED STATES PATENT AND TRADEMARK OFFICE
CERTIFICATE OF CORRECTION

PATENT NO.   :   6,022,126
DATED        :   February 8, 2000
INVENTOR(S)  :   Kumajiro SEKINE and Takeshi KOBAYASHI It is certified that error appears in the above-identified patent and that said Letters Patent is hereby corrected as shown below:

At col. 4, line 33, change "of a as shown in FIG. 3. The apex angle a is 45° in this embodiment" to --of $\alpha$ as shown in FIG. 3. The apex angle $\alpha$ is 45° in this embodiment--.

Signed and Sealed this

Seventh Day of November, 2000

Attest:

Q. TODD DICKINSON

*Attesting Officer*      *Director of Patents and Trademarks*